US009445393B2

(12) United States Patent
Lin et al.

(10) Patent No.: US 9,445,393 B2
(45) Date of Patent: Sep. 13, 2016

(54) PAGING OF A USER EQUIPMENT (UE) WITHIN A WIRELESS COMMUNICATIONS SYSTEM

(71) Applicant: QUALCOMM Incorporated, San Diego, CA (US)

(72) Inventors: Yih-Hao Lin, San Diego, CA (US); Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 14/136,092

(22) Filed: Dec. 20, 2013

(65) Prior Publication Data

US 2014/0105184 A1 Apr. 17, 2014

Related U.S. Application Data

(62) Division of application No. 12/782,585, filed on May 18, 2010, now Pat. No. 8,711,772.

(60) Provisional application No. 61/180,650, filed on May 22, 2009.

(51) Int. Cl.
*H04B 7/216* (2006.01)
*H04W 68/02* (2009.01)
(Continued)

(52) U.S. Cl.
CPC ............. *H04W 68/02* (2013.01); *H04W 68/00* (2013.01); *H04W 76/021* (2013.01); *H04W 4/10* (2013.01); *H04W 76/005* (2013.01)

(58) Field of Classification Search
None
See application file for complete search history.

(56) References Cited

U.S. PATENT DOCUMENTS 7,957,393 B2 *  6/2011  Lundin ............... H04L 12/5695
                                                        370/338
8,274,956 B2     9/2012  Meylan et al.
(Continued)

FOREIGN PATENT DOCUMENTS

JP    2005260987 A    9/2005
JP    2009535980 A   10/2009
(Continued)

OTHER PUBLICATIONS

International Search Report and Written Opinion—PCT/US2010/035473, International Search Authority—European Patent Office—Sep. 21, 2010.
(Continued)

*Primary Examiner* — Anh Ngoc Nguyen
(74) *Attorney, Agent, or Firm* — Raphael Freiwirth; Michael F. Taveira

(57) ABSTRACT

A user equipment (UE) determines to activate a data session. The UE configures a data session activation request message to include an indication of an association with communication sessions of a given type (e.g., delay-sensitive communication sessions), and then transmits the data session activation request message to an access network. The access network determines to establish an aggressive paging cycle of a downlink channel for the UE based in part upon receiving a message (e.g., which can be different than the data session activation request message) that conveys the indication of the association to the access network. The access network sends at least one instruction for facilitating an allocation of the aggressive paging cycle to the UE, and the UE receives the at least one instructions and monitors the downlink channel accordingly.

17 Claims, 9 Drawing Sheets

(51) Int. Cl.
*H04W 68/00* (2009.01)
*H04W 76/02* (2009.01)
*H04W 4/10* (2009.01)
*H04W 76/00* (2009.01)

(56) References Cited

U.S. PATENT DOCUMENTS

| | | | |
|---|---|---|---|
| 2008/0070594 A1* | 3/2008 | Barber | H04W 68/02 455/458 |
| 2008/0273488 A1 | 11/2008 | Shaheen | |
| 2008/0274751 A1 | 11/2008 | Tinnakornsrisuphap et al. | |
| 2009/0258861 A1* | 10/2009 | Lunn | C07D 471/04 514/217.04 |
| 2011/0134888 A1 | 6/2011 | Lin et al. | |

FOREIGN PATENT DOCUMENTS

| | | |
|---|---|---|
| JP | 2009543476 A | 12/2009 |
| JP | 2010524361 A | 7/2010 |
| JP | 2010538506 A | 12/2010 |
| KR | 20090049082 A | 5/2009 |
| WO | 2006011775 A2 | 2/2006 |
| WO | 2007130281 A2 | 11/2007 |
| WO | 2009030251 A1 | 3/2009 |

OTHER PUBLICATIONS

Qualcomm Europe: "Paging for LTE" 3GPP Draft; R2-061200, 3rd Generation Partnership Project (3GPP), Mobile Competence Centre; 650, Route Des Lucioles; F-06921 Sophia-Antipolis Cedex; France, vol . RAN WG2, No. Shanghai, China; 20060503, May 3, 2006.

* cited by examiner

Example Set-up of a communication session in accordance with W-CDMA protocol

Example Set-up of a communication session in accordance with W-CDMA protocol

PAGING OF A USER EQUIPMENT (UE) WITHIN A WIRELESS COMMUNICATIONS SYSTEM

The present Application for Patent is a divisional of Non-Provisional application Ser. No. 12/782,585, entitled "PAGING A USER EQUIPMENT (UE) WITHIN A WIRELESS COMMUNICATIONS SYSTEM", filed May 18, 2010, which in turn claims priority to Provisional Application No. 61/180,650, entitled "PAGING A USER EQUIPMENT (UE) WITHIN A WIRELESS COMMUNICATIONS SYSTEM", filed May 22, 2009, each of which is assigned to the assignee hereof and each of which is hereby expressly incorporated by reference herein in its entirety.

BACKGROUND OF THE INVENTION

1. Field of the Invention

Embodiments of the invention relate to paging of a user equipment (UE) within a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

In W-CDMA wireless communication systems, user equipments (UEs) receive signals from fixed position Node Bs (also referred to as cell sites or cells) that support communication links or service within particular geographic regions adjacent to or surrounding the base stations. Node Bs provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the Node Bs generally interact with UEs through an over the air interface and with the RAN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as W-CDMA, CDMA, FDMA, TDMA, GSM, etc. In a dispatch model, communication between endpoints (e.g., UEs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

SUMMARY

A user equipment (UE) determines to activate a data session. The UE configures a data session activation request message to include an indication of an association with communication sessions of a given type (e.g., delay-sensitive communication sessions), and then transmits the data session activation request message to an access network. The access network determines to establish an aggressive paging cycle of a downlink channel for the UE based in part upon receiving a message (e.g., which can be different than the data session activation request message) that conveys the indication of the association to the access network. The access network sends at least one instruction for facilitating an allocation of the aggressive paging cycle to the UE, and the UE receives the at least one instructions and monitors the downlink channel accordingly.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
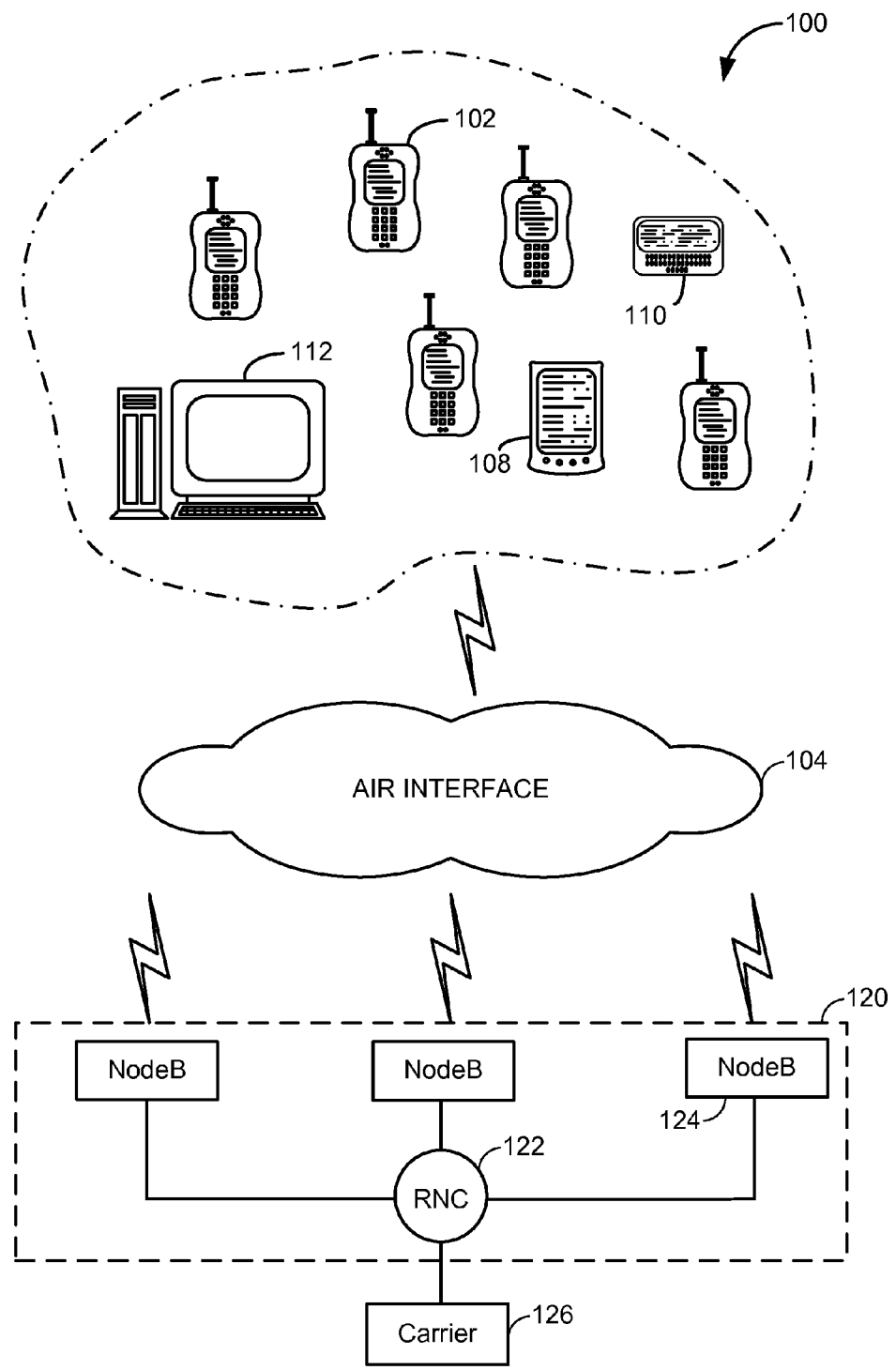
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as a user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple access terminals.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention.

System 100 can contain UEs, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal", "AT", "wireless device", "client device", "mobile terminal", "mobile station" and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a

RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2A:
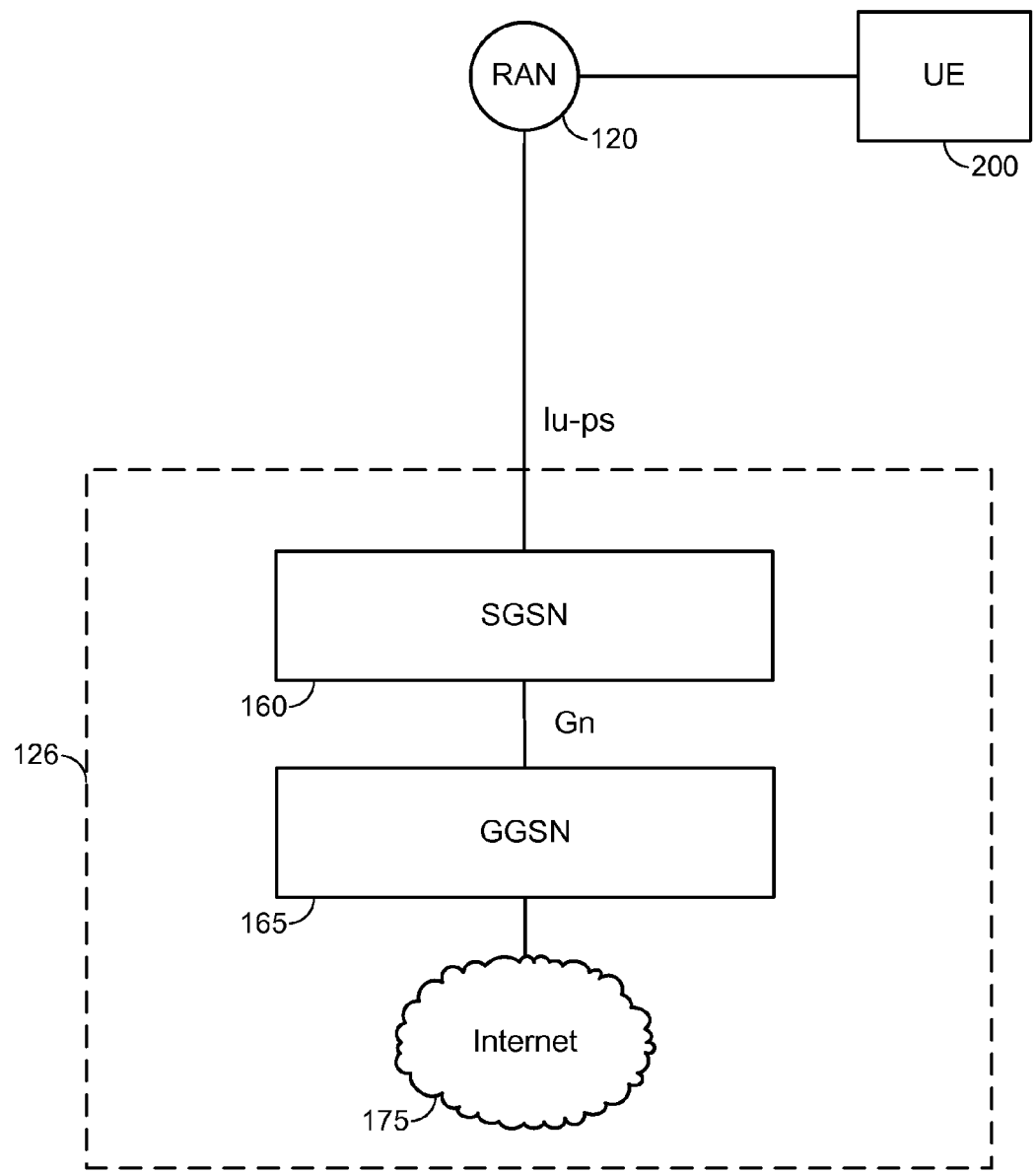
FIG. 2A illustrates the core network of FIG. 1 according to an embodiment of the present invention.

FIG. 2A illustrates the core network 126 according to an embodiment of the present invention. In particular, FIG. 2A illustrates components of a General Packet Radio Services (GPRS) core network implemented within a W-CDMA system. In the embodiment of FIG. 2A, the core network 126 includes a Serving GPRS Support Node (SGSN) 160, a Gateway GPRS Support Node (GGSN) 165 and an Internet 175. However, it is appreciated that portions of the Internet 175 and/or other components may be located outside the core network in alternative embodiments.

Generally, GPRS is a protocol used by Global System for Mobile communications (GSM) phones for transmitting Internet Protocol (IP) packets. The GPRS Core Network (e.g., the GGSN 165 and one or more SGSNs 160) is the centralized part of the GPRS system and also provides support for W-CDMA based 3G networks. The GPRS core network is an integrated part of the GSM core network, provides mobility management, session management and transport for IP packet services in GSM and W-CDMA networks.

The GPRS Tunneling Protocol (GTP) is the defining IP protocol of the GPRS core network. The GTP is the protocol which allows end users (e.g., access terminals) of a GSM or W-CDMA network to move from place to place while continuing to connect to the internet as if from one location at the GGSN 165. This is achieved transferring the subscriber's data from the subscriber's current SGSN 160 to the GGSN 165, which is handling the subscriber's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2A, the GGSN 165 acts as an interface between the GPRS backbone network (not shown) and the external packet data network 175. The GGSN 165 extracts the packet data with associated packet data protocol (PDP) format (e.g., IP or PPP) from the GPRS packets coming from the SGSN 160, and sends the packets out on a corresponding packet data network. In the other direction, the incoming data packets are directed by the GGSN 165 to the SGSN 160 which manages and controls the Radio Access Bearer (RAB) of the destination UE served by the RAN 120. Thereby, the GGSN 165 stores the current SGSN address of the target UE and his/her profile in its location register (e.g., within a PDP context). The GGSN is responsible for IP address assignment and is the default router for the connected UE. The GGSN also performs authentication and charging functions.

The SGSN 160 is representative of one of many SGSNs within the core network 126, in an example. Each SGSN is responsible for the delivery of data packets from and to the UEs within an associated geographical service area. The tasks of the SGSN 160 includes packet routing and transfer, mobility management (e.g., attach/detach and location management), logical link management, and authentication and charging functions. The location register of the SGSN stores location information (e.g., current cell, current VLR) and user profiles (e.g., IMSI, PDP address(es) used in the packet data network) of all GPRS users registered with the SGSN 160, for example, within one or more PDP contexts for each user or UE. Thus, SGSNs are responsible for (i) de-tunneling downlink GTP packets from the GGSN 165, (ii) uplink tunnel IP packets toward the GGSN 165, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in Universal Mobile Telecommunications System (UMTS) system architecture) communicates with the SGSN 160 via a Iu interface, with a transmission protocol such as Frame Relay or IP. The SGSN 160 communicates with the GGSN 165 via a Gn interface, which is an IP-based interface between SGSN 160 and other SGSNs (not shown) and internal GGSNs, and uses the GTP protocol defined above (e.g., GTP-U, GTP-C, GTP', etc.). While not shown in FIG. 2A, the Gn interface is also used by the Domain Name System (DNS). The GGSN 165 is connected to a Public Data Network (PDN) (not shown), and in turn to the Internet 175, via a Gi interface with IP protocols either directly or through a Wireless Application Protocol (WAP) gateway.

The PDP context is a data structure present on both the SGSN 160 and the GGSN 165 which contains a particular UE's communication session information when the UE has an active GPRS session. When a UE wishes to initiate a GPRS communication session, the UE must first attach to the SGSN 160 and then activate a PDP context with the GGSN 165. This allocates a PDP context data structure in the SGSN 160 that the subscriber is currently visiting and the GGSN 165 serving the UE's access point.

Figure 2B:
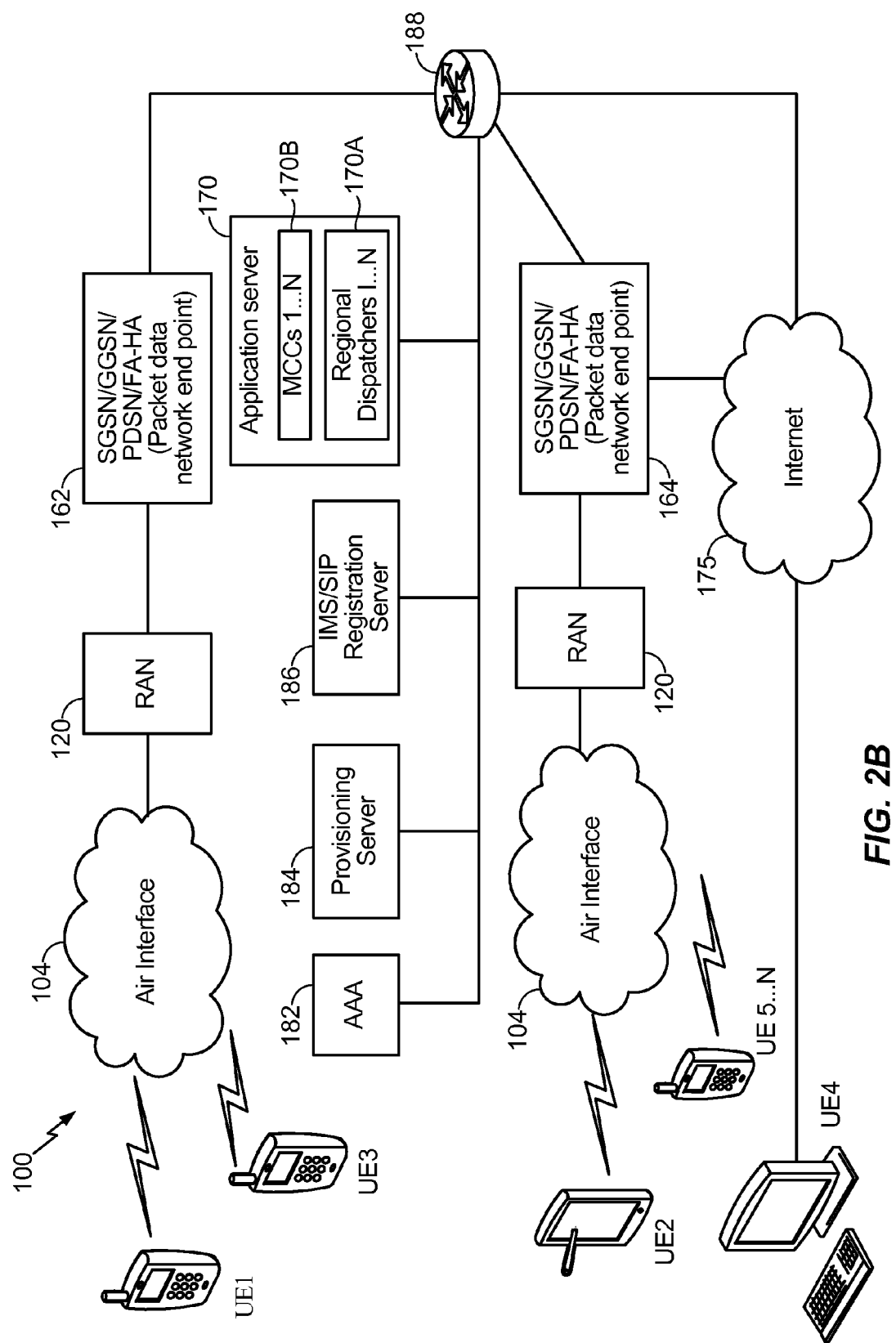
FIG. 2B illustrates an example of the wireless communications system 100 of FIG. 1 in more detail.

FIG. 2B illustrates an example of the wireless communications system 100 of FIG. 1 in more detail. In particular, referring to FIG. 2B, UEs 1 . . . N are shown as connecting to the RAN 120 at locations serviced by different packet data network end-points. The illustration of FIG. 2B is specific to W-CDMA systems and terminology, although it will be appreciated how FIG. 2B could be modified to confirm with a 1x EV-DO system. Accordingly, UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 . . . N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 can then connect to any of the system components described above.

Referring to FIG. 2B, UEs 1, 3 and 5 . . . N are illustrated as wireless cell-phones, UE 2 is illustrated as a wireless tablet-PC and UE 4 is illustrated as a wired desktop station. However, in other embodiments, it will be appreciated that the wireless communication system 100 can connect to any type of UE, and the examples illustrated in FIG. 2B are not intended to limit the types of UEs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Further, referring to FIG. 2B, the application server 170 is illustrated as including a plurality of media control complexes (MCCs) 1 ... N 170B, and a plurality of regional dispatchers 1 ... N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between UEs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the UEs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
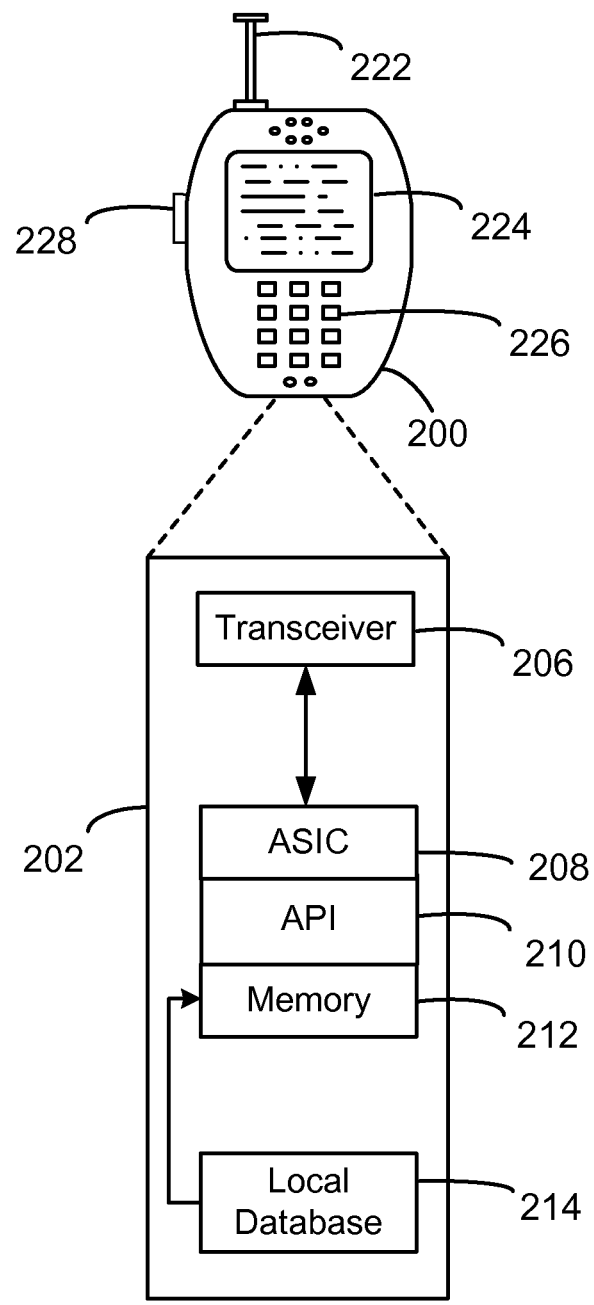
FIG. 3 is an illustration of an access terminal in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API') 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. For example, in W-CDMA, the data communication is typically between the client device 102, Node B(s) 124, and the RNC 122. The RNC 122 can be connected to multiple data networks such as the core network 126, PSTN, the Internet, a virtual private network, a SGSN, a GGSN and the like, thus allowing the UE 102 or 200 access to a broader communication network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Below, embodiments of the invention are generally described in accordance with W-CDMA protocols and associated terminology (e.g., such as UE instead of mobile station (MS), mobile unit (MU), access terminal (AT), etc., RNC, contrasted with BSC in EV-DO, or Node B, contrasted with BS or MPT/BS in EV-DO, etc.). However, it will be readily appreciated by one of ordinary skill in the art how the embodiments of the invention can be applied in conjunction with wireless communication protocols other than W-CDMA.

In a conventional server-arbitrated communication session (e.g., via half-duplex protocols, full-duplex protocols, VoIP, a group session over IP unicast, a group session over IP multicast, a push-to-talk (PTT) session, a push-to-transfer (PTX) session, etc.), a session or call originator sends a request to initiate a communication session to the application server 170, which then forwards a call announcement message to the RAN 120 for transmission to one or more targets of the call.

User Equipments (UEs), in a Universal Mobile Telecommunications Service (UMTS) Terrestrial Radio Access Network (UTRAN) (e.g., the RAN 120) may be in either an idle mode or a radio resource control (RRC) connected mode.

Based on UE mobility and activity while in a RRC connected mode, the RAN 120 may direct UEs to transition between a number of RRC sub-states; namely, CELL_PCH, URA_PCH, CELL_FACH, and CELL_DCH states, which may be characterized as follows:

In the CELL_DCH state, a dedicated physical channel is allocated to the UE in uplink and downlink, the UE is known on a cell level according to its current active set, and the UE has been assigned dedicated transport channels, downlink and uplink (TDD) shared transport channels, and a combination of these transport channels can be used by the UE.

In the CELL_FACH state, no dedicated physical channel is allocated to the UE, the UE continuously monitors a forward access channel (FACH), the UE is assigned a default common or shared transport channel in the uplink (e.g., a random access channel (RACH), which is a contention-based channel with a power ramp-up procedure to acquire the channel and to adjust transmit power) that the UE can transmit upon according to the access procedure for that transport channel, the position of the UE is known by RAN 120 on a cell level according to the cell where the UE last made a previous cell update, and, in TDD mode, one or several USCH or DSCH transport channels may have been established.

In the CELL_PCH state, no dedicated physical channel is allocated to the UE, the UE selects a PCH with the algorithm, and uses DRX for monitoring the selected PCH via an associated PICH, no uplink activity is possible and the position of the UE is known by the RAN 120 on cell level according to the cell where the UE last made a cell update in CELL_FACH state.

In the URA_PCH state, no dedicated channel is allocated to the UE, the UE selects a PCH with the algorithm, and uses DRX for monitoring the selected PCH via an associated PICH, no uplink activity is possible, and the location of the UE is known to the RAN 120 at a Registration area level according to the UTRAN registration area (URA) assigned to the UE during the last URA update in CELL_FACH state.

Accordingly, URA_PCH State (or CELL_PCH State) corresponds to a dormant state where the UE periodically wakes up to check a paging indicator channel (PICH) and, if needed, the associated downlink paging channel (PCH), and it may enter CELL_FACH state to send a Cell Update message for the following event: cell reselection, periodical cell update, uplink data transmission, paging response, re-entered service area. In CELL_FACH State, the UE may send messages on the random access channel (RACH), and may monitor a forward access channel (FACH). The FACH carries downlink communication from the RAN 120, and is mapped to a secondary common control physical channel (S-CCPCH). From CELL_FACH State, the UE may enter CELL_DCH state after a traffic channel (TCH) has been obtained based on messaging in CELL_FACH state. A table showing conventional dedicated traffic channel (DTCH) to transport channel mappings in radio resource control (RRC) connected mode, is in Table 1 as follows:

TABLE 1

DTCH to Transport Channel mappings in RRC connected mode

| | RACH | FACH | DCH | E-DCH | HS-DSCH |
|---|---|---|---|---|---|
| CELL_DCH | No | No | Yes | Yes | Yes |
| CELL_FACH | Yes | Yes | No | Yes (rel. 8) | Yes (rel. 7) |
| CELL_PCH | No | No | No | No | Yes (rel. 7) |
| URA_PCH | No | No | No | No | No | wherein the notations (rel. 8) and (rel. 7) indicate the associated 3GPP release where the indicated channel was introduced for monitoring or access.

Figure 4:
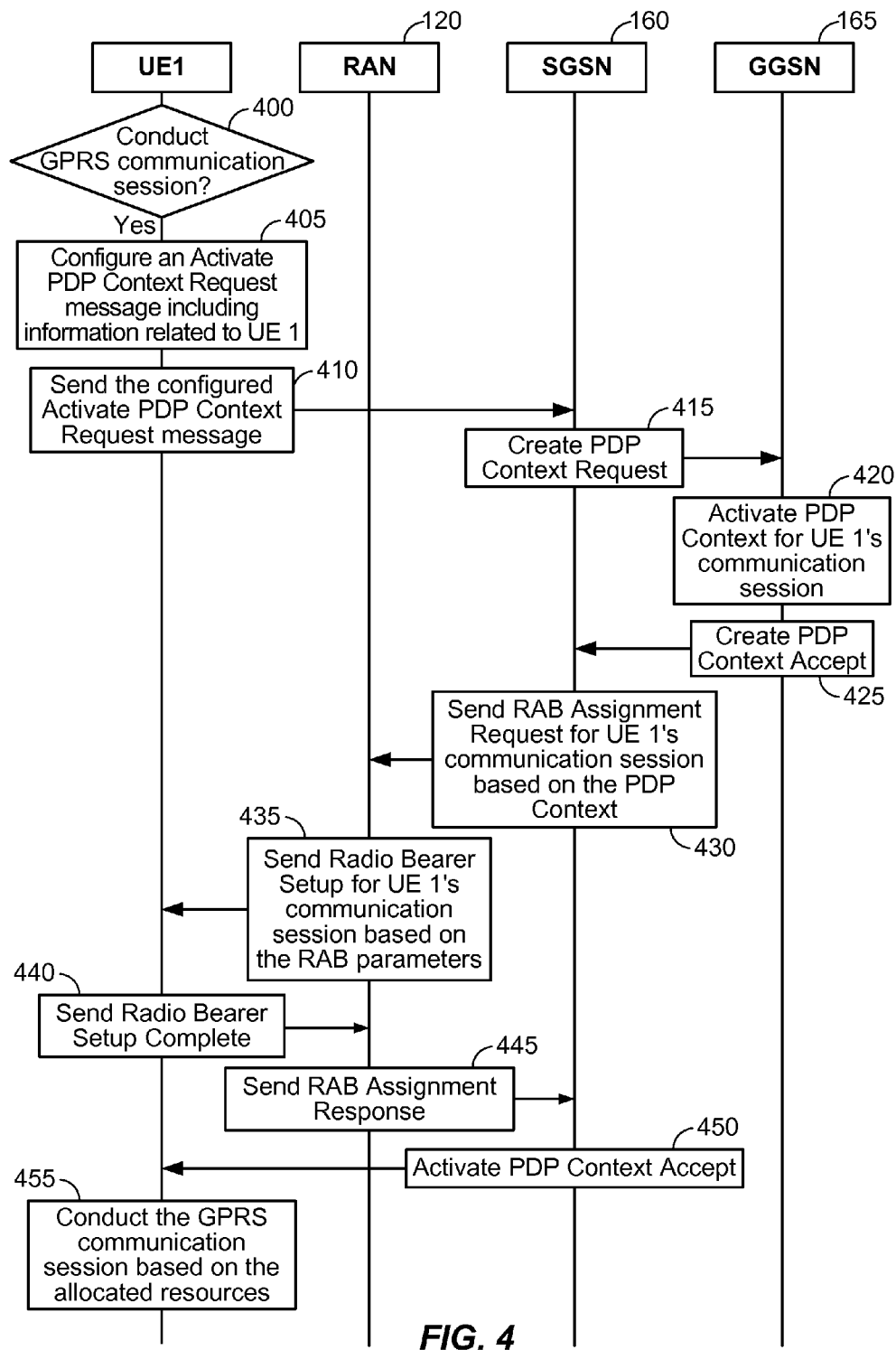
FIG. 4 illustrates a conventional packet data protocol (PDP) context activation and resource allocation for a General Packet Radio Services (GPRS) communication session.

FIG. 4 illustrates a conventional process for setting up a given GPRS communication session. In particular, FIG. 4 illustrates a conventional manner of activating a PDP context for the given GPRS communication session, as well as allocating resources to an UE for supporting the given GPRS communication session based on the activated PDP context.

Referring to FIG. 4, UE 1 determines whether to conduct a GPRS communication session, 400. For example, the determination of 400 may correspond to the startup of a push-to-talk (PTT) application on UE 1 if the GPRS communication session corresponds to a group PTT call (e.g., a multicast call, etc.). If UE 1 determines to conduct a GPRS communication session, UE 1 is required to activate a PDP context for the session. Thus, UE 1 configures an Activate PDP Context Request message that includes information related to UE 1 for the GPRS communication session, 405. For example, the Activate PDP Context Request message may be configured to include the Requested QoS for the session, an access point name (APN) of the GGSN 165 (e.g., which may be obtained after a DNS query), etc. If the PDP Address, to which packets are addressed during the GPRS communication session, is dynamically assigned by the GGSN 165, in the Activate PDP Context Request message, the PDP Address field is empty because the PDP context for UE 1's session has not yet been activated.

After configuring the Activate PDP Context Request message in 405, UE 1 sends the configured Activate PDP Request message to the SGSN 160 via the RAN 120, 410. The SGSN 160 receives the Activate PDP Context Request message and sends a Create PDP Context Request message to the GGSN 165, 415. The GGSN 165 receives the Create PDP Context Request message from the SGSN 160, and activates a PDP context for UE 1's communication session, 420. Both SGSN and GGSN may retrieve the subscribed QoS profile from HLR and modify the requested QoS for the PDP context. The activation of the PDP context in 420 includes assigning a PDP address for UE 1's communication session (e.g., an IPv6 address). The GGSN 165 sends a Create PDP Context Accept message back to the SGSN 160, 425, which indicates that the Create PDP Context Request message from 415 is accepted and also conveys the PDP address for UE 1's communication session. The SGSN 160 sends a RAB assignment request for UE 1's communication session based on the PDP context to the RAN 120, 430. For example, the SGSN 160 may instruct the RAN 120 with regard to a given level of QoS resources for allocating to UE 1 during the communication session using the RAB Parameter field in the RAB Assignment Request, which contains the QoS requirements on UE 1's communication link. The RAN 120 receives the RAB assignment request and sends a Radio Bearer Setup message for UE 1's communication session based on the RAB parameters, 435. UE 1 receives the Radio Bearer Setup message, configures the Radio Bearer accordingly, and sends a Radio Bearer Setup Complete message to the RAN 120, 440. The RAN 120 then sends a RAB Assignment Response message back to the SGSN 160, 445. At this point, the SGSN 160 sends an Activate PDP Context Accept message to UE 1 via the RAN 120, 450, which indicates that the Activate PDP Context Request message from 410 is accepted and also conveys the PDP address for UE 1's communication session.

After receiving the Activate PDP Context Accept message in 450 (e.g., which conveys the PDP address to be used for the session), UE 1 may begin to send and receive messages related to the established communication session, 455.

As will be appreciated by one of ordinary skill in the art, while the PDP context can indicate the PDP-type (e.g., primary or secondary), PDP parameters (e.g., ToS, APN, QoS, PDP address, etc.), identifiers (e.g., a Network Service Access Point Identifier (NSAPI, TI), TEID, etc.) and/or other parameters, conventional PDP contexts do not include information related to the application or service associated with the GPRS communication session being activated and are supported by UE 1. For example, if the GPRS communication session corresponds to the signaling of a PTT call that UE 1 wishes to initiate or join, the signaling of PTT call is a highly delay-sensitive interactive application. However, the SGSN 160 and GGSN 165 may recognize that the application is an originating interactive call but do not necessarily have special knowledge with regard to the nature of the application, and as such do not know that the session is delay or time-sensitive. Thus, the SGSN 160 and GGSN 165 do not necessarily grant aggressive resources to UE 1, which can degrade performance for UE 1's communication session.

Embodiments which will be described below in more detail are directed to conveying application or service-specific information from a UE requesting PDP context activation to the RAN 120, SGSN 160 and/or GGSN 165, and storing the conveyed application or service-specific information in the PDP context. The RAN 120, SGSN 160 and/or GGSN 165 may then allocate resources to the requesting UE for the communication session based at least in part on the application or service-specific information.

Figure 5A:
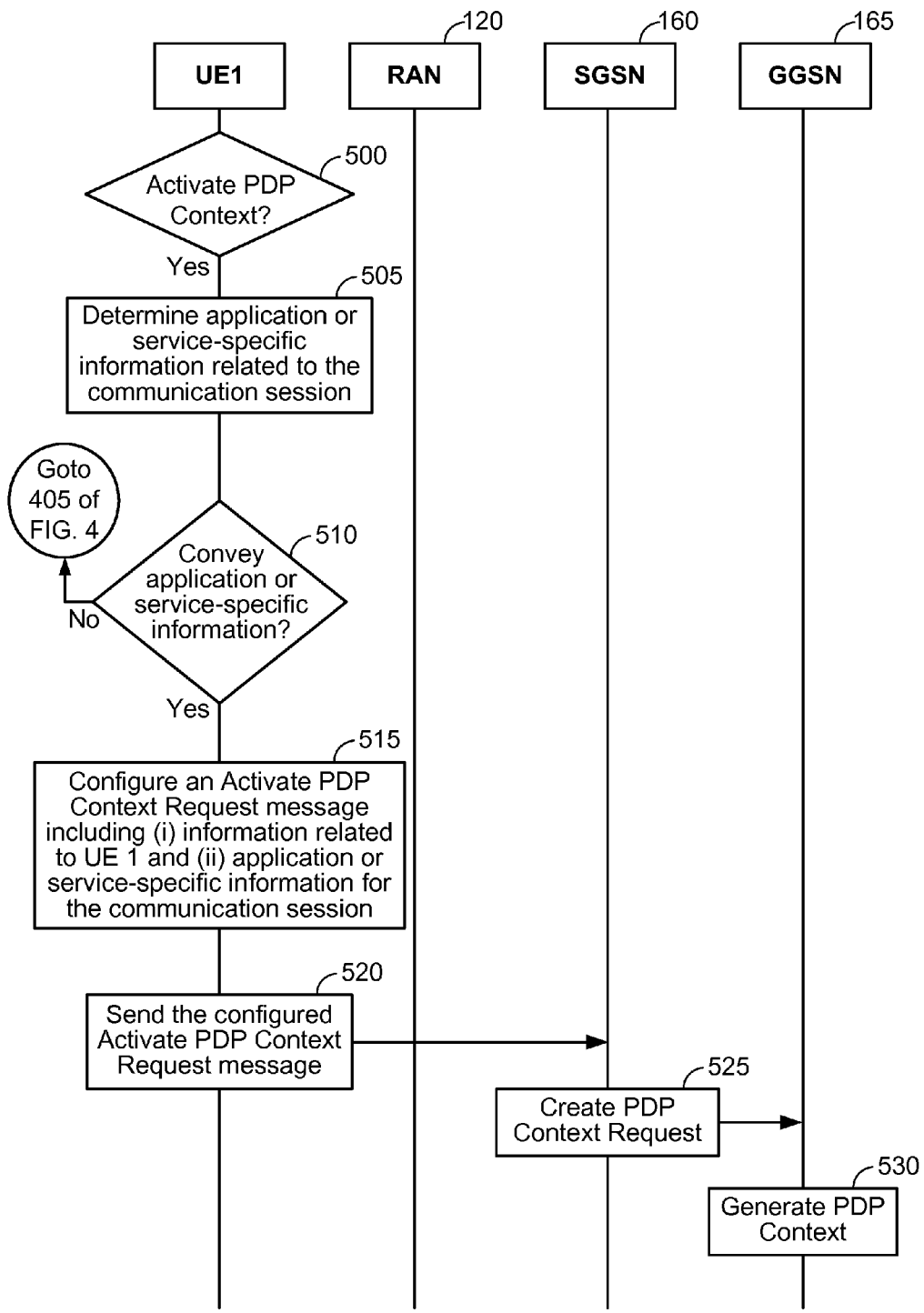
FIGS. 5A and 5B illustrate PDP context activation and resource allocated for a GPRS communication service and/or application according to an embodiment.
Figure 5B:
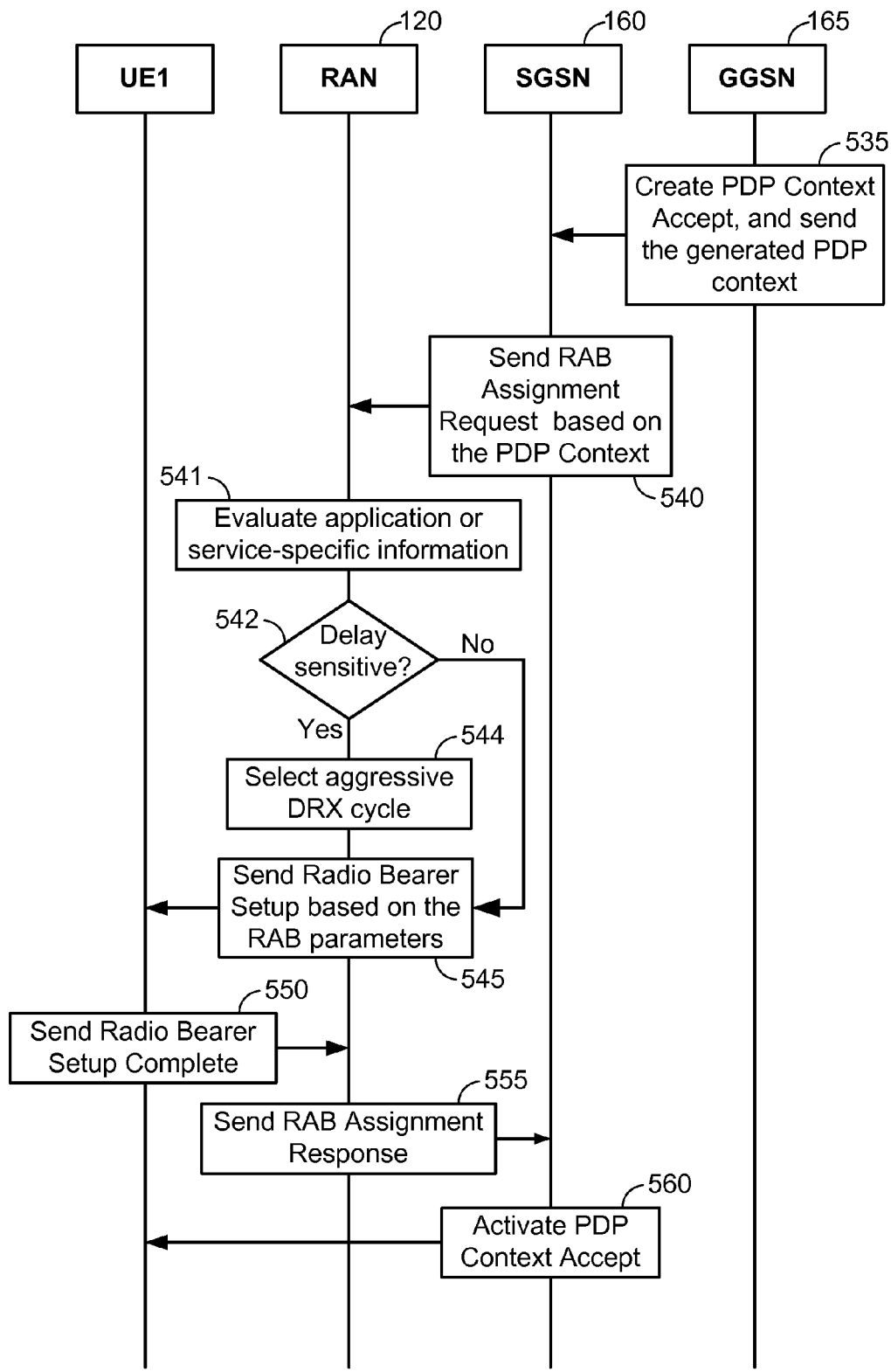

Accordingly, FIGS. 5A and 5B illustrate a process for activating a PDP context according to an embodiment of the invention. In particular, FIGS. 5A and 5B illustrate a manner of activating a PDP context for a given GPRS communication service and/or application that is configured to include application or service-specific information related to potential sessions invoked for the service and/or application.

Referring to FIGS. 5A and 5B, UE 1 determines whether to active a PDP context, 500. For example, the determination of 400 may be performed when UE 1 powers-up even if UE 1 does not wish to immediately join or initiate a PTT call or other delay-sensitive application, such that UE 1 determines to activate the PDP context for the application and/or service even in the absence of an immediate desire to conduct a communication session for the application and/or service. Accordingly, it will be appreciated that the PDP context activation may be a preemptive activation to a particular service or application that occurs prior to a setup of a communication session involving the particular service or application. For example, the preemptive activation may occur when UE 1 powers-up such that the RAN 120, SGSN 160 and/or GGSN 165 is aware that UE 1 is active for the particular service and/or application even when UE 1 is not currently engaged in, or requesting initiation of, a communication session.

After determining to activate the PDP context for the given GPRS communication session, service and/or application in 500, UE 1 determines, if possible, application or service-specific information related to the GPRS communication service and/or application, 505. As used herein, application or service-specific information is defined as any information related to a service or application supported by UE 1. With regard to the group PTT call example, the application or service-specific information may correspond to recognition that UE 1 is a group-member of one or more PTT groups.

In 510, UE 1 determines whether to convey the application or service-specific information determined in 505 to the SGSN 160 and/or the GGSN 165. For example, if the GPRS communication service and/or application is not delay-sensitive, then UE 1 may determine not to send application-specific information in 510, and the process may advance to 405 of FIG. 4, as described above. Otherwise, if UE 1 determines to convey the application or service-specific information determined in 505 to the SGSN 160 and/or the GGSN 165 (e.g., if the GPRS communication service and/or application is delay-sensitive, etc.), then the process advances to 515.

In 515, UE 1 configures an Activate PDP Context Request message that includes information related to UE 1 for the GPRS communication service and/or application, similar to 405 of FIG. 4. For example, the Activate PDP Context Request message may be configured to include UE 1's an access point name (APN) of the GGSN 165 (e.g., which may be obtained after a DNS query), etc. In the Activate PDP Context Request message, the PDP Address field, to which packets are addressed during sessions invoked for the GPRS communication service and/or application, is empty because the PDP context for UE 1's service and/or application has not yet been activated.

However, in 515 of FIG. 5A, the Activate PDP Context Request message is further configured to indicate the application or service-specific information related to the GPRS communication service and/or application that is determined in 505 of FIG. 5A. The application or service-specific information can be included within the Activate PDP Context Request message in a number of ways. For example, one or more fields within the Activate PDP Context Request message itself can be modified to include a flag that indicates the application or service-specific information.

In a more specific example, UE 1 can configure the Activate PDP Context Request message (e.g., for primary PDP context) and/or the Activate Secondary PDP Context Request (e.g., for secondary PDP context) in 515 to include special QoS configuration(s), such that the GGSN 165 and SGSN 160 can uniquely identify UE 1 within the operator's network based on the special configuration. Also, since the SGSN 160 will pass the QoS to the RNC at the RAN 120 in the RAB Assignment Request message (utilizing the RAB Parameter field) (e.g., see 540, below), the RNC or RAN 120 can also identify UE 1 based on the special QoS configuration, and hence allocate UTRAN resources required by the multimedia application (e.g., aggressive UTRAN_DRX_CYCLE, which is used to determine the paging cycle at UE 1 ).

In yet another example, in 515, UE 1 can select a reserved NSAPI (e.g., such as 0 to 4, which are currently prohibited and not used by standard), and include the reserved NSAPI in the Activate PDP Context Request and/or Activate Secondary PDP Context Request. As in the previous example, the GGSN 165 and SGSN 160 will read the message(s) and be able to uniquely identify the reserved NSAPI as being for a particular multimedia application and/or service (e.g., such as one that is known to require a high-level or aggressive-level of QoS). Also, since the RAB ID in the RAB Assignment Request (e.g., see 540, below) is mandated to be the same value of NSAPI, the RAN 120 can identify UE 1 based on the RAB ID.

In an alternative embodiment, special or predetermined bits can be embedded in the NSAPI information element (IE). The NSAPI IE is 8 bits, where the first 4 LSB are used to carry the NSAPI and the last 4 LSB are spare bits. Thus, in this example, UE 1 can utilize the 4 spare bits in the NSAPI IE for the SGSN 160 and GGSN 165 to identify UE 1. Since RAB ID IE=NSAPI IE per standard, the RAN 120 can identify UE 1 and can assign aggressive UTRAN_DRX CYCLE to UE 1.

In yet another alternative example, an APN is a string parameter included in the Activate PDP Context Request used to select the GGSN 165. Accordingly, in 515, UE 1 can put a keyword in the APN for identifying UE 1 as having a high-QoS requirement. The GGSN 165 and SGSN 160 can receive the APN in the Activate PDP Context Request. However, the RAN 120 may not necessarily be informed of UE 1's high-QoS requirement for a particular application and/or service in this example (e.g., although the RAN 120 can be instructed to allocate an aggressive QoS setting via the RAB Assignment Request message from the SGSN in 540, below). For example, the SGSN may override the Requested QoS in the Activate PDP Context Request, and can send the new or overridden QoS to the serving RNC at the RAN 120 within the RAB Parameter field in the RAB Assignment message. The new QoS may contain configurations or QoS attributes not in the Requested QoS (e.g., for interactive class traffic, the attribute of allocation/retention priority (ARP) can only be assigned by the SGSN/GGSN for the serving RNC to uniquely identify UE subscribing to a particular application (e.g., a PTT service), or more specifically, the application's RAB.

After configuring the Activate PDP Context Request message in 515, UE 1 sends the configured Activate PDP Request message to the SGSN 160 via the RAN 120, 520. The SGSN 160 receives the Activate PDP Context Request message and sends a Create PDP Context Request message, which also includes the application or service-specific information, to the GGSN 165, 525. The GGSN 165 receives the Create PDP Context Request message from the SGSN 160, and activates a PDP context for UE 1's communication service and/or application, 530. The activation of the PDP context in 530 includes assigning a PDP address for UE 1's communication service and/or application (e.g., an IPv6 address). The activation of 530 also includes storing, within the PDP context, the application or service-specific information for UE 1's communication service and/or application.

The GGSN 165 sends a Create PDP Context Accept message back to the SGSN 160, 535, which indicates that the Create PDP Context Request message from 525 is accepted and also conveys the PDP address and application or service-specific information for UE 1's communication service and/or application. The SGSN 160 generates the RAB assignment request and includes, within the RAB assignment request, information from which the RAN 120 (e.g., more specifically, the serving RNC at the RAN 120) can determine the application or service-specific information of UE 1. The SGSN then sends the RAB assignment request to the RAN 120, 540. For example, in the RAB assignment request, the SGSN 160 may instruct the RAN 120 with regard to a given level of QoS resources for allocating to UE 1 during sessions invoked for the communication service and/or application using the RAB Parameter field in the RAB Assignment Request, which contains the QoS requirements on UE 1's communication link. If the application or service-specific information indicates, to the SGSN 160 in this example, that a high-level of QoS resources are required, the SGSN 160 can instruct the RAN 120 to allocate a higher amount of QoS resources to UE 1 than would otherwise be allocated in 540. In another example, as discussed above with respect to 541 through 544, a frequency at which UE 1 wakes up (e.g., a DRX cycle) can be increased if the application or service-specific information indicates, to the SGSN 160 in this example, that UE 1's communication service and/or application may benefit from a more aggressive paging cycle due to delay sensitivity of the service and/or application.

As discussed above with respect to the characteristics normally associated with CELL_PCH state and/or URA PCH state (e.g., 'dormant' states), a UE in either of these states uses a given DRX cycle or paging interval for monitoring the selected PCH via an associated PICH. Thus, at each DRX cycle, a UE in CELL_PCH and/or URA_PCH state wakes up and checks a PICH and/or PCH to determine whether that particular UE is being paged. Conventionally, the same DRX cycle is used for all UEs in either CELL_PCH or URA_PCH state. In at least one embodiment of the invention, however, a more aggressive or shorter DRX cycle or paging cycle can be used for UEs that subscribe to a delay-sensitive GPRS communication service or application, as indicated by the application or service-specific information from UE 1.

Accordingly, in 541, the serving RNC at the RAN 120 evaluates the application or service-specific information included in the Activate PDP Context Request message from UE 1 (e.g., based on RAB parameters in the RAB assignment request that indicate the application or service-specific information to trigger special handling protocols by the RAN 120), to determine if UE 1's GPRS communication service and/or application is delay sensitive. If the serving RNC of the RAN 120 determines that UE 1's GPRS communication service and/or application is not delay sensitive in 542, then the process advances to 545 and the RAN 120 sends a Radio Bearer Setup message for UE 1's communication service and/or application that assigns a default or generic DRX cycle for UE 1 to use during a dormant state (e.g., a URA_PCH or CELL_PCH state) based on the RAB parameters, 545. Alternatively, if the serving RNC of the RAN 120 determines that UE 1's GPRS communication service and/or application is delay sensitive in 542, then the process either advances to 544 and the serving RNC of the RAN selects an aggressive DRX cycle, 544.

Accordingly, the RAN 120 receives the RAB assignment request and sends a Radio Bearer Setup message for UE 1's communication service and/or application based on the RAB parameters (e.g., either with a normal or aggressive DRX cycle, based on the evaluation of blocks 541 through 544), 545. UE 1 receives the Radio Bearer Setup message, and sends a Radio Bearer Setup Complete message to the RAN 120, 550. The RAN 120 then sends a RAB Assignment Response message back to the SGSN 160, 555.

At this point, the SGSN 160 sends an Activate PDP Context Accept message to UE 1 via the RAN 120, 560, which indicates that the Activate PDP Context Request message from 520 is accepted and also conveys the PDP address for UE 1's communication service and/or application. While not shown in FIGS. 5A and 5B, after receiving the Activate PDP Context Accept message (e.g., which conveys the PDP address to be used for the service and/or application), UE 1 may begin to send and receive messages related to a session established for the activated GPRS communication service and/or application.

Accordingly, as will be appreciated by one of ordinary skill in the art, FIGS. 5A and 5B show how the RAN 120 (e.g., a serving RNC of the RAN 120), the SGSN 160 and/or the GGSN 165 can be informed, by the UE 1, with regard to UE 1 being 'active' for a particular application and/or service. Also, for delay sensitive applications and/or services, the UE 1 can be assigned a more aggressive DRX cycle for its URA_PCH state and/or CELL_PCH state by the RAN 120 (e.g., a serving RNC of UE 1), such that UE 1 can potentially be paged more quickly, as will be described next with respect to FIGS. 6A and 6B.

Figure 6A:
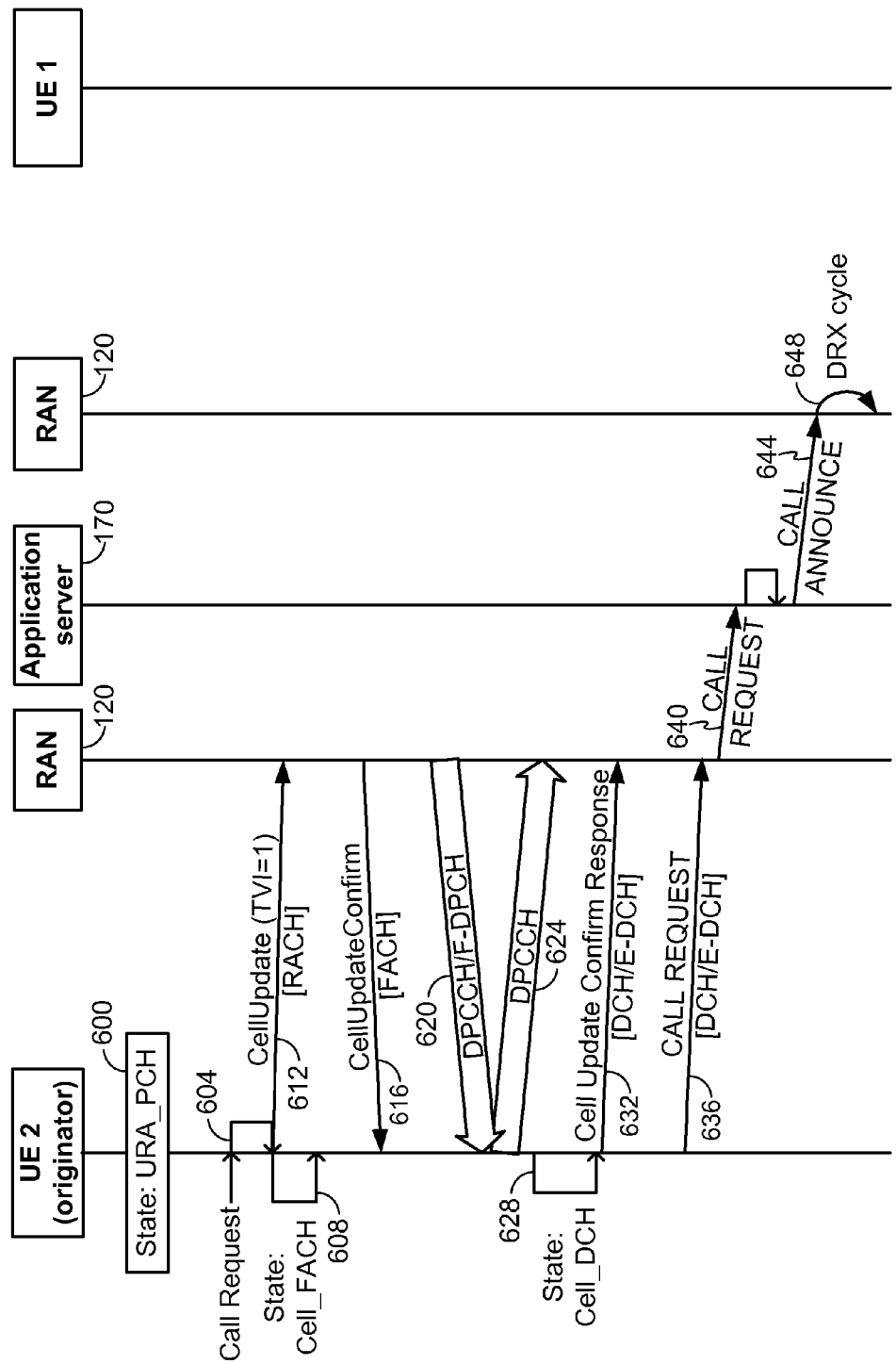
FIGS. 6A and 6B illustrate a process of setting up a server-arbitrated communication session in accordance with an embodiment of the invention.
Figure 6B:
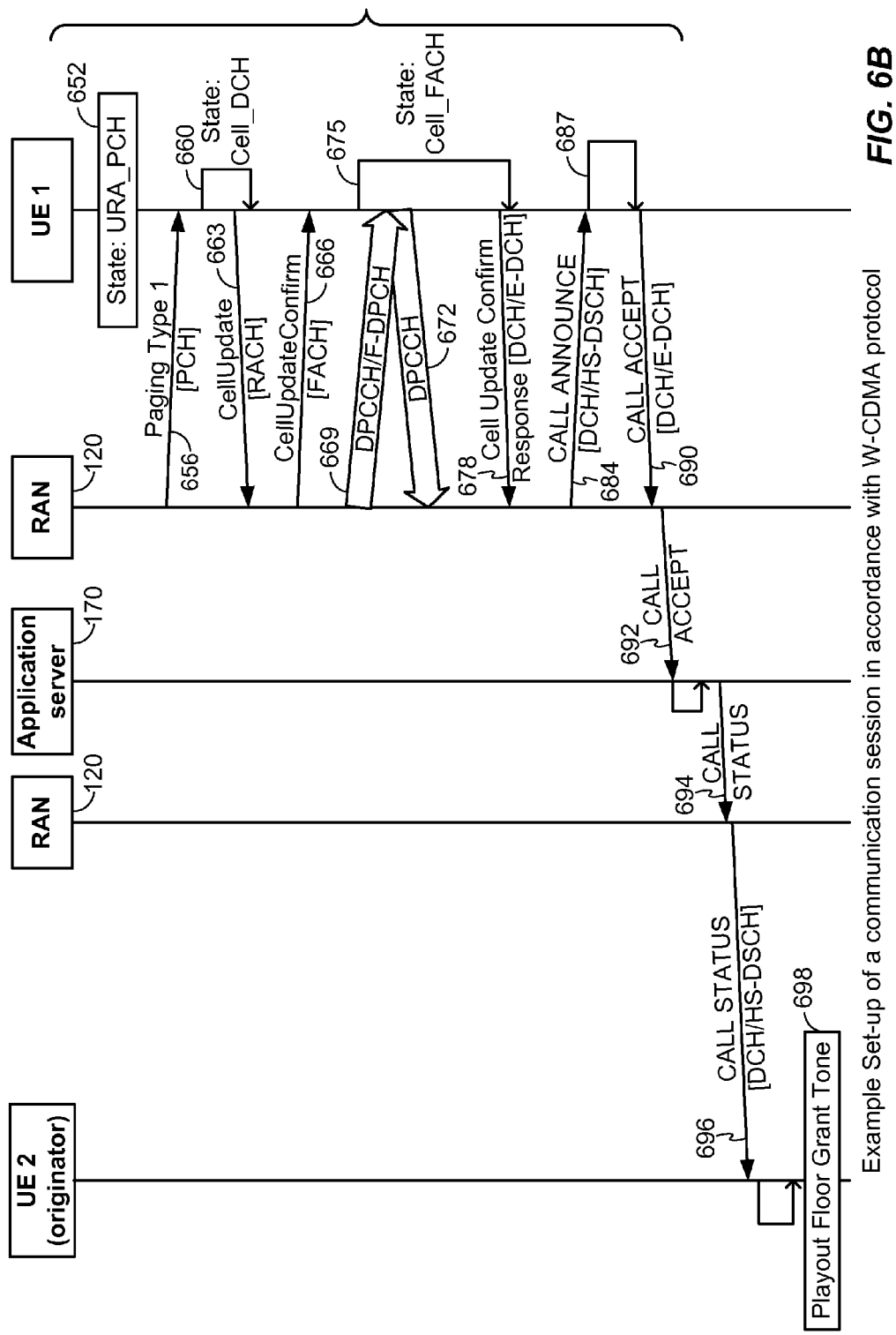

Accordingly, a process by which a server-arbitrated communication session can be set-up is described with respect to FIGS. 6A and 6B. In particular, FIGS. 6A and 6B illustrate a server-arbitrated session set-up process wherein the system 100 corresponds to a Universal Mobile Telecommunications System (UMTS) that uses Wideband Code Division Multiple Access (W-CDMA). However, it will be appreciated by one of ordinary skill in the art how FIGS. 6A and 6B can be modified to be directed to communication sessions in accordance with protocols other than W-CDMA.

Referring to FIGS. 6A and 6B, 600 through 698 generally correspond to blocks 400 through 498, respectively, of FIG. 4 of co-pending U.S. Provisional Application No. 61/180, 645, entitled "ANNOUNCING A COMMUNICATION SESSION WITHIN A WIRELESS COMMUNICATIONS SYSTEM", assigned to the assignee hereof and hereby expressly incorporated by reference herein in its entirety and hereby incorporated by reference in its entirety. Accordingly, the discussion contained herein is limited to 640 through 656 of FIGS. 6A and 6B for the sake of brevity.

The application server 170 processes a call request message from a call originator ("UE 2"), 640, and generates an announce message for announcing the communication session to target UE 1 and forwards the announce message to the RAN 120, 644. As will be appreciated by one of ordinary skill in the art, the RAN 120 cannot simply transmit the announce message to UE 1 immediately after receiving the call announce message from the application server 170. Rather, the RAN 120 waits for a next DRX cycle or paging cycle at which target UE 1 are expected to be monitoring for pages, 648. In an example, assume that the process of FIGS. 5A and 5B has already executed for UE 1, and that UE 1 has been allocated an aggressive DRX paging cycle. Because it has been assumed that UE 1 is provisioned with the more aggressive DRX paging cycle by a previous execution of the process of FIGS. 5A and 5B, the RAN 120 waits a shorter period of time in 648 as compared to if a longer DRX cycle is used. For convenience of explanation, it may be assumed that UE 1 is in URA PCH state at this point, 652, and is monitoring the PCH and/or PICH in accordance with the 'aggressive or shorter DRX cycle. While not shown in FIGS. 6A and 6B, if UE 1 already had an active traffic channel (TCH), the RAN 120 could simply send the announce message on the already-allocated TCH. After the RAN 120 waits for the DRX cycle or paging cycle of UE 1, a type 1 paging message is sent to UE 1. The remainder of FIGS. 6A and 6B may then be executed as described in the above-noted co-pending U.S. Provisional Application No. 61/180, 645 filed on May 22, 2009, having which is incorporated by reference in its entirety.

As will be appreciated from a review of FIGS. 6A and 6B, the aggressive paging cycle or DRX cycle allocated to UE 1 decreases the call setup time for the server-arbitrated communication session because UE 1 can be paged more quickly.

While above-described embodiments of the invention have generally been described with respect to terminology that is specific to CDMA, W-CDMA and/or EV-DO protocols, it will be appreciated that other embodiments of the invention can be modified to comply with other wireless telecommunication protocols, such as UMTS LTE and/or SAE, in an example. For example, in a UMTS implementation, the above-described call flows are still generally applicable. However, the terminology of PDP context, RNC (or RNC 122), SGSN and GGSN may instead be described as Evolved Packet System (EPS) bearer, eNodeB, Serving Gateway (GW) and packet data network (PDN) GW, respectively. Accordingly, the technical modifications to conform the CDMA implementation described above to a UMTS implementation are well within the abilities of one of ordinary skill in the art.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of activating a data session at an access network within a wireless communications system operating in accordance with a given wireless communications protocol, comprising:
receiving a message during an activation procedure of the data session for a user equipment (UE), the received message including an indication that the data session is associated with communication sessions of a given type, wherein the data session is configured to remain activated for the UE while the UE is operating in an active mode associated with participation in one or more communication sessions of the given type and an idle mode;
determining to establish an aggressive paging cycle of a downlink channel for the UE while operating in the idle mode based at least in part on the indication contained in the received message; and
sending at least one instruction for facilitating an allocation of the aggressive paging cycle to the UE.

2. The method of claim 1, wherein the given wireless communications protocol corresponds to Wideband Code Division Multiple Access (W-CDMA).

3. The method of claim 1, wherein the data session corresponds to a packet data protocol (PDP) Context.

4. The method of claim 3, wherein the PDP Context corresponds to a Primary or Secondary PDP Context.

5. The method of claim 1, wherein the downlink channel corresponds to a downlink paging channel (PCH) or a downlink paging indicator channel (PICH).

6. The method of claim 1, wherein the received message is received from a higher-level network entity relative to the access network.

7. The method of claim 6, wherein the received message corresponds to a Radio Bearer (RAB) Assignment Request message from a General Packet Radio Services (GPRS) Support Node (SGSN) that is serving the UE.

8. The method of claim 1, wherein the at least one instruction corresponds to a Radio Bearer (RAB) Setup message.

9. The method of claim 1, wherein the indication is based on another indication contained in an earlier message from the UE, the another indication corresponding to an application-layer parameter that was not evaluated directly by the access network.

10. The method of claim 9, wherein the earlier message from the UE corresponds to an Activate Packet Data Protocol (PDP) Context Request message.

11. The method of claim 1, further comprising:
receiving data for transmission to the UE; and
paging the UE on the downlink channel in accordance with the aggressive paging cycle.

12. The method of claim 1, wherein the communication sessions of the given type correspond to delay-sensitive and/or low data-rate applications.

13. The method of claim 12, wherein the communication sessions of the given type correspond Push-to-Talk (PTT) communication sessions, Voice-over-Internet-Protocol (VoIP) communication sessions and/or Push-to-Transfer (PTX) communication sessions.

14. The method of claim 1,
wherein the communication sessions of the given type have a high Quality-of-Service (QoS) requirement,
and wherein the aggressive paging cycle is established to satisfy the high QoS requirement.

15. An access network configured to activate a data session within a wireless communications system operating in accordance with a given wireless communications protocol, comprising:
means for receiving a message during an activation procedure of the data session for a user equipment (UE), the received message including an indication that the data session is associated with communication sessions of a given type, wherein the data session is configured to remain activated for the UE while the UE is operating in an active mode associated with participation in one or more communication sessions of the given type and an idle mode;
means for determining to establish an aggressive paging cycle of a downlink channel for the UE while operating in the idle mode based at least in part on the indication contained in the received message; and
means for sending at least one instruction for facilitating an allocation of the aggressive paging cycle to the UE.

16. An access network configured to activate a data session within a wireless communications system operating in accordance with a given wireless communications protocol, comprising:
a processor and memory configured to:
receive a message during an activation procedure of the data session for a user equipment (UE), the received message including an indication that the data session is associated with communication sessions of a given type, wherein the data session is configured to remain activated for the UE while the UE is operating in an active mode associated with participation in one or more communication sessions of the given type and an idle mode;
determine to establish an aggressive paging cycle of a downlink channel for the UE while operating in the idle mode based at least in part on the indication contained in the received message; and
send at least one instruction for facilitating an allocation of the aggressive paging cycle to the UE.

17. A non-transitory computer-readable storage medium containing instructions which, when executed by an access network configured to activate a data session within a wireless communications system operating in accordance with a given wireless communications protocol, cause the access network to perform operations, the instructions comprising:

program code to receive a message during an activation procedure of the data session for a user equipment (UE), the received message including an indication that the data session is associated with communication sessions of a given type, wherein the data session is configured to remain activated for the UE while the UE is operating in an active mode associated with participation in one or more communication sessions of the given type and an idle mode;

program code to determine to establish an aggressive paging cycle of a downlink channel for the UE while operating in the idle mode based at least in part on the indication contained in the received message; and program code to send at least one instruction for facilitating an allocation of the aggressive paging cycle to the UE.

* * * * *